(12) United States Patent
Trachtman

(10) Patent No.: US 10,306,005 B1
(45) Date of Patent: May 28, 2019

(54) DATA RETRIEVAL SYSTEM AND METHOD

(71) Applicant: EMC Corporation, Hopkinton, MA (US)

(72) Inventor: Michael Trachtman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 292 days.

(21) Appl. No.: 14/871,909

(22) Filed: Sep. 30, 2015

(51) Int. Cl.
*H04L 29/08* (2006.01)

(52) U.S. Cl.
CPC ...... *H04L 67/2842* (2013.01); *H04L 67/1095* (2013.01); *H04L 67/1097* (2013.01)

(58) Field of Classification Search
CPC ............. H04L 67/2842; H04L 67/1095; H04L 67/1097; G06F 2212/262; G06F 2212/263; G06F 2212/27; G06F 2212/283; G06F 2212/286; G06F 2212/285; G06F 3/0689; G06F 3/065
USPC ........................................................ 709/213
See application file for complete search history.

(56) References Cited

U.S. PATENT DOCUMENTS

| | | | | |
|---|---|---|---|---|
| 5,884,098 A * | 3/1999 | Mason, Jr. | ............ | G06F 3/0626 710/1 |
| 5,950,230 A * | 9/1999 | Islam | ............ | G06F 13/10 710/10 |
| 6,931,591 B1 * | 8/2005 | Brown | ............ | G06F 17/24 345/619 |
| 6,973,537 B1 * | 12/2005 | Kowalchik | ......... | G06F 12/0866 711/113 |
| 2007/0143344 A1 * | 6/2007 | Luniewski | ........ | G06F 17/30696 |
| 2011/0295807 A1 * | 12/2011 | Bernbo | ............ | G06F 11/1662 707/634 |
| 2012/0036330 A1 * | 2/2012 | Saito | ............ | G06F 3/0617 711/162 |
| 2013/0036265 A1 * | 2/2013 | Bert | ............ | G06F 3/0611 711/113 |
| 2013/0080723 A1 * | 3/2013 | Sawa | ............ | G06F 3/0607 711/162 |
| 2014/0289419 A1 * | 9/2014 | Vijayant | ............ | H04L 65/1069 709/227 |
| 2014/0380007 A1 * | 12/2014 | Suen | ............ | G06F 3/0604 711/162 |

* cited by examiner

*Primary Examiner* — Patrice L Winder
*Assistant Examiner* — Aye M Aung
(74) *Attorney, Agent, or Firm* — Brian J. Colandreo; Heath M. Sargeant; Holland & Knight LLP

(57) ABSTRACT

A method, computer program product, and computing system for receiving a read request from a computing device for content stored in a storage system. The storage system is a mirrored storage system that includes a plurality of backend storage targets that each contain a copy of the content. The content is requested from each of the plurality of backend storage targets. The content is obtained from a first responding backend storage target, chosen from the plurality of backend storage targets, thus defining obtained content. The obtained content is provided to the computing device that provided the read request.

9 Claims, 4 Drawing Sheets

DATA RETRIEVAL SYSTEM AND METHOD

TECHNICAL FIELD

This disclosure relates to storage systems and, more particularly, to systems and methods for retrieving data.

BACKGROUND

Storing and safeguarding electronic content is of paramount importance in modern business. Accordingly, various methodologies may be employed to protect such electronic content. One such methodology is to mirror the stored data between multiple storage devices/systems. Accordingly, multiple copies of data are often stored within a single storage system. Unfortunately, when a particular data portion is requested from the storage system, the requested data is obtained from a single source even though the requested data may be available from other (and possibly quicker) sources.

SUMMARY OF DISCLOSURE

In one implementation, a computer-implemented method includes receiving a read request from a computing device for content stored in a storage system. The storage system is a mirrored storage system that includes a plurality of backend storage targets that each contain a copy of the content. The content is requested from each of the plurality of backend storage targets. The content is obtained from a first responding backend storage target, chosen from the plurality of backend storage targets, thus defining obtained content. The obtained content is provided to the computing device that provided the read request.

One or more of the following features may be included. Prior to requesting the content from each of the plurality of backend storage targets, it may be determined if the content is available in a frontend cache system. If the content is available in the frontend cache system, the content may be obtained from the frontend cache system, thus defining the obtained content. Obtaining the content from a first responding backend storage target may include determining if the content is available in a backend cache system associated with the first responding backend storage target. If the content is available in the backend cache system associated with the first responding backend storage target, the content may be obtained from the backend cache system associated with the first responding backend storage target, thus defining the obtained content. The plurality of backend storage targets may include at least one hard disk drive. The plurality of backend storage targets may include at least one solid state disk.

In another implementation, a computer program product resides on a computer readable medium and has a plurality of instructions stored on it. When executed by a processor, the instructions cause the processor to perform operations including receiving a read request from a computing device for content stored in a storage system. The storage system is a mirrored storage system that includes a plurality of backend storage targets that each contain a copy of the content. The content is requested from each of the plurality of backend storage targets. The content is obtained from a first responding backend storage target, chosen from the plurality of backend storage targets, thus defining obtained content. The obtained content is provided to the computing device that provided the read request.

One or more of the following features may be included. Prior to requesting the content from each of the plurality of backend storage targets, it may be determined if the content is available in a frontend cache system. If the content is available in the frontend cache system, the content may be obtained from the frontend cache system, thus defining the obtained content. Obtaining the content from a first responding backend storage target may include determining if the content is available in a backend cache system associated with the first responding backend storage target. If the content is available in the backend cache system associated with the first responding backend storage target, the content may be obtained from the backend cache system associated with the first responding backend storage target, thus defining the obtained content. The plurality of backend storage targets may include at least one hard disk drive. The plurality of backend storage targets may include at least one solid state disk.

In another implementation, a computing system including a processor and memory is configured to perform operations including receiving a read request from a computing device for content stored in a storage system. The storage system is a mirrored storage system that includes a plurality of backend storage targets that each contain a copy of the content. The content is requested from each of the plurality of backend storage targets. The content is obtained from a first responding backend storage target, chosen from the plurality of backend storage targets, thus defining obtained content. The obtained content is provided to the computing device that provided the read request.

One or more of the following features may be included. Prior to requesting the content from each of the plurality of backend storage targets, it may be determined if the content is available in a frontend cache system. If the content is available in the frontend cache system, the content may be obtained from the frontend cache system, thus defining the obtained content. Obtaining the content from a first responding backend storage target may include determining if the content is available in a backend cache system associated with the first responding backend storage target. If the content is available in the backend cache system associated with the first responding backend storage target, the content may be obtained from the backend cache system associated with the first responding backend storage target, thus defining the obtained content. The plurality of backend storage targets may include at least one hard disk drive. The plurality of backend storage targets may include at least one solid state disk.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
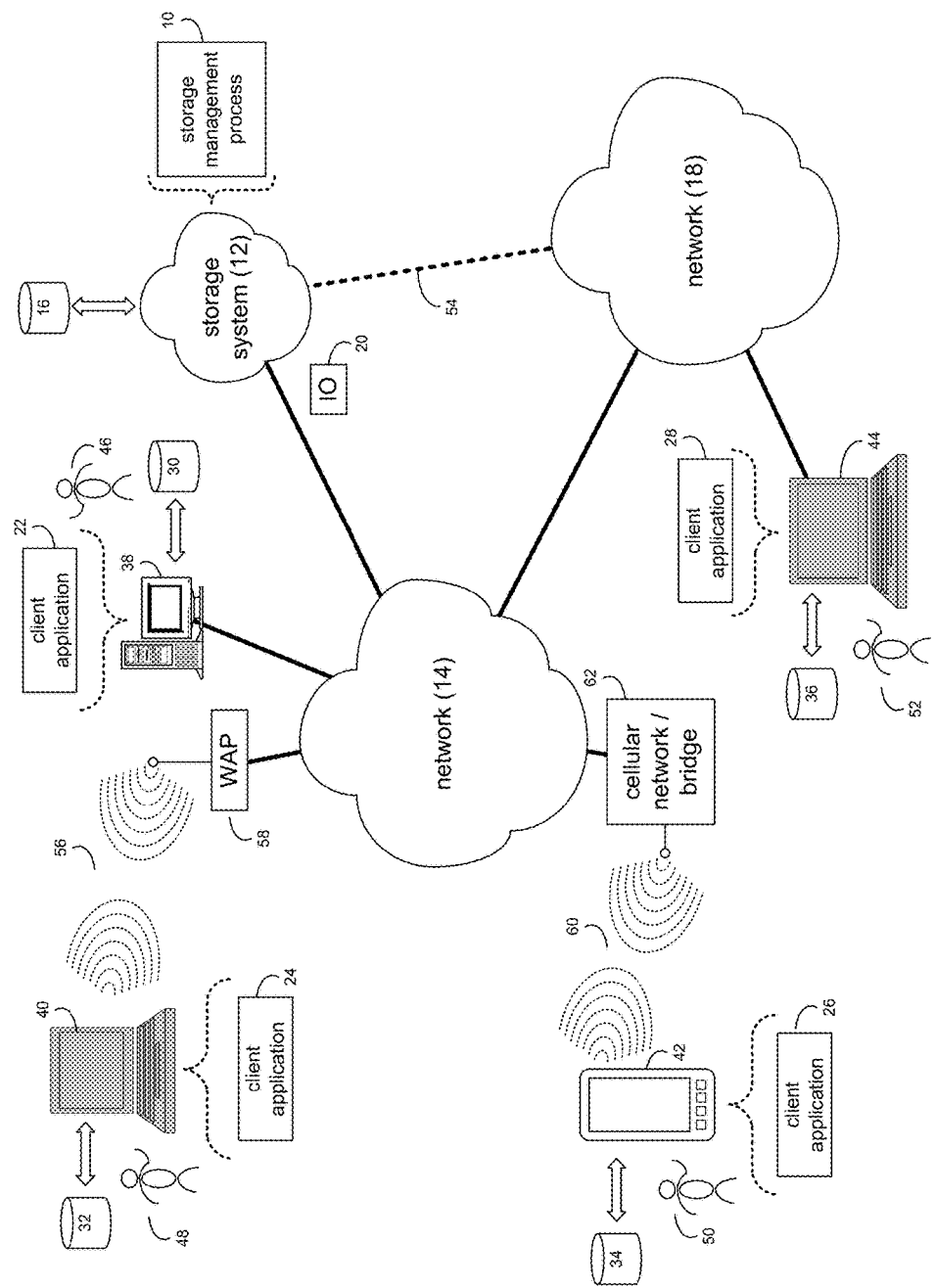
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
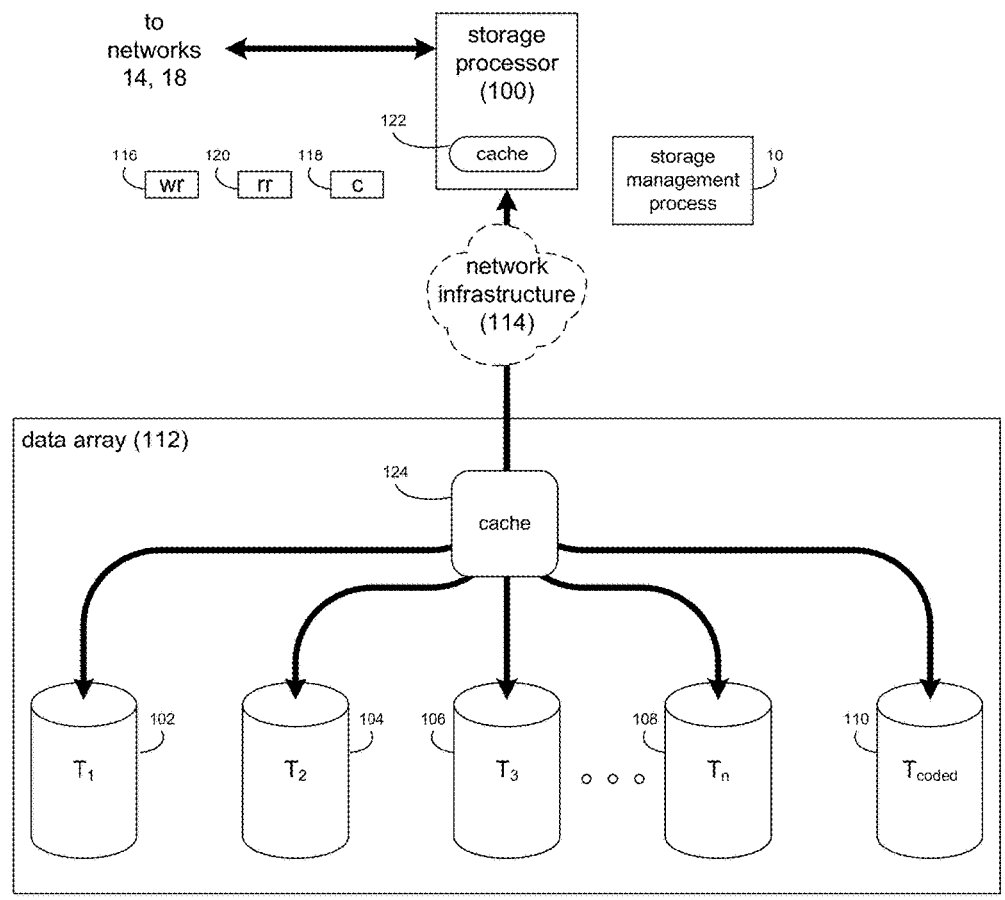
FIG. 2 is a diagrammatic view of the storage system of FIG. 1.

Referring also to FIG. 2, storage system 12 may include storage processor 100 and a plurality of storage targets T 1-n (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

During operation of storage processor 100, content 118 to be written to storage system 12 may be received by storage processor 100. Additionally/alternatively and when storage processor 100 is configured as an application server, content 118 to be written to storage system 12 may be internally generated by storage processor 100.

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

Figure 3:
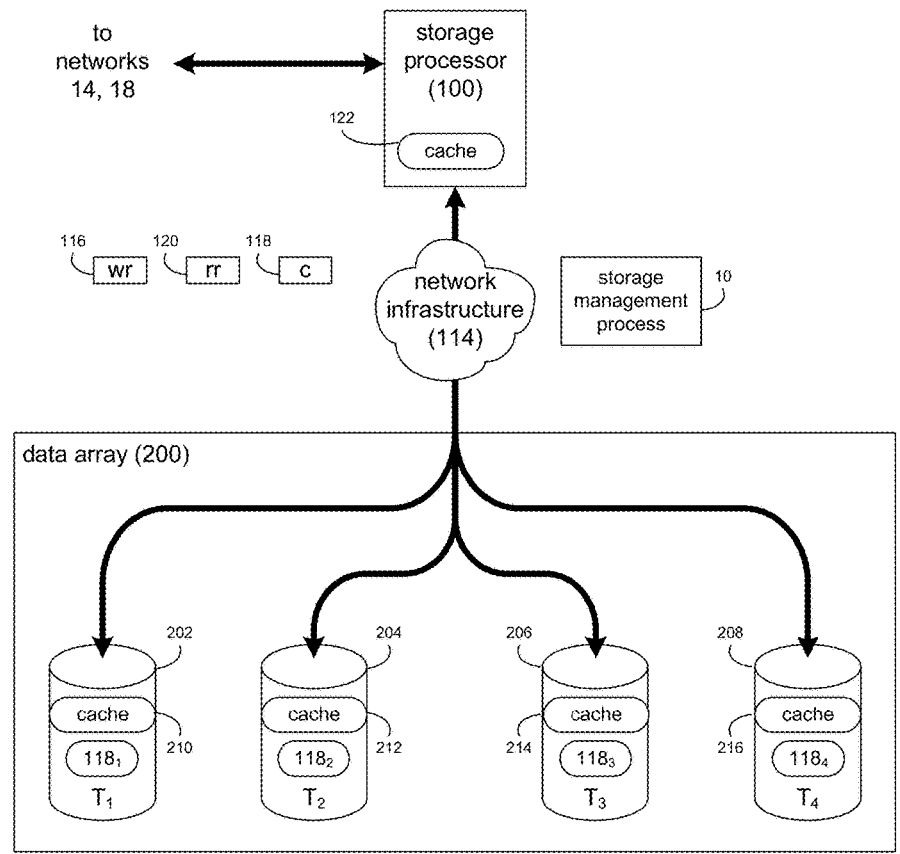
FIG. 3 is a diagrammatic view of another embodiment of the storage system of FIG. 1.

The Storage Management Process:

Referring also to FIG. 3 and for the following illustrative example, assume that storage system 12 is configured to include storage processor 100 having frontend cache system 122. Data array 200 is shown to include storage targets 202, 204, 206, 208 configured as a RAID 1 array, wherein content is mirrored between the four storage targets. As discussed above, by mirroring data between storage targets, a level of high availability may be achieved as multiple copies of the data are stored within storage system 12.

Further, assume for this example that storage system 12 is configured as a Storage Area Network (SAN), wherein each of storage targets 202, 204, 206, 208 may be some form of storage device (e.g., one or more hard disk drives, an NAS system, or another SAN). Additionally, each of storage targets 202, 204, 206, 208 may include a backend cache system, namely backend cache systems 210, 212, 214, 216 (respectively). During operation of data array 200, data to be written to a specific storage target within data array 200 may first be written to the backend cache system associated with the specific storage target.

Assume for the following example that write request 116 is processed by storage system 12, resulting in content 118 being written to storage system 12. Specifically, storage management process 10 may immediately write content 118 to frontend cache system 122. As discussed above and in this example, data array 200 includes storage targets 202, 204, 206, 208 configured as a RAID 1 array, wherein content is mirrored between the four storage targets. Accordingly, content 118 may be provided by storage processor 100 to each of storage targets 202, 204, 206, 208 included within data array 200.

Further and as discussed above, each of storage targets 202, 204, 206, 208 may include a backend cache system, namely backend cache systems 210, 212, 214, 216 (respectively). Accordingly, when writing content 118 to each of storage targets 202, 204, 206, 208, content 118 may initially be written to backend cache systems 210, 212, 214, 216 and subsequently written to storage targets 202, 204, 206, 208 (respectively), resulting in four identical copies of content 118 being stored on data array 112 (namely content $118_1$, $118_2$, $118_3$, $118_4$ respectively).

Figure 4:
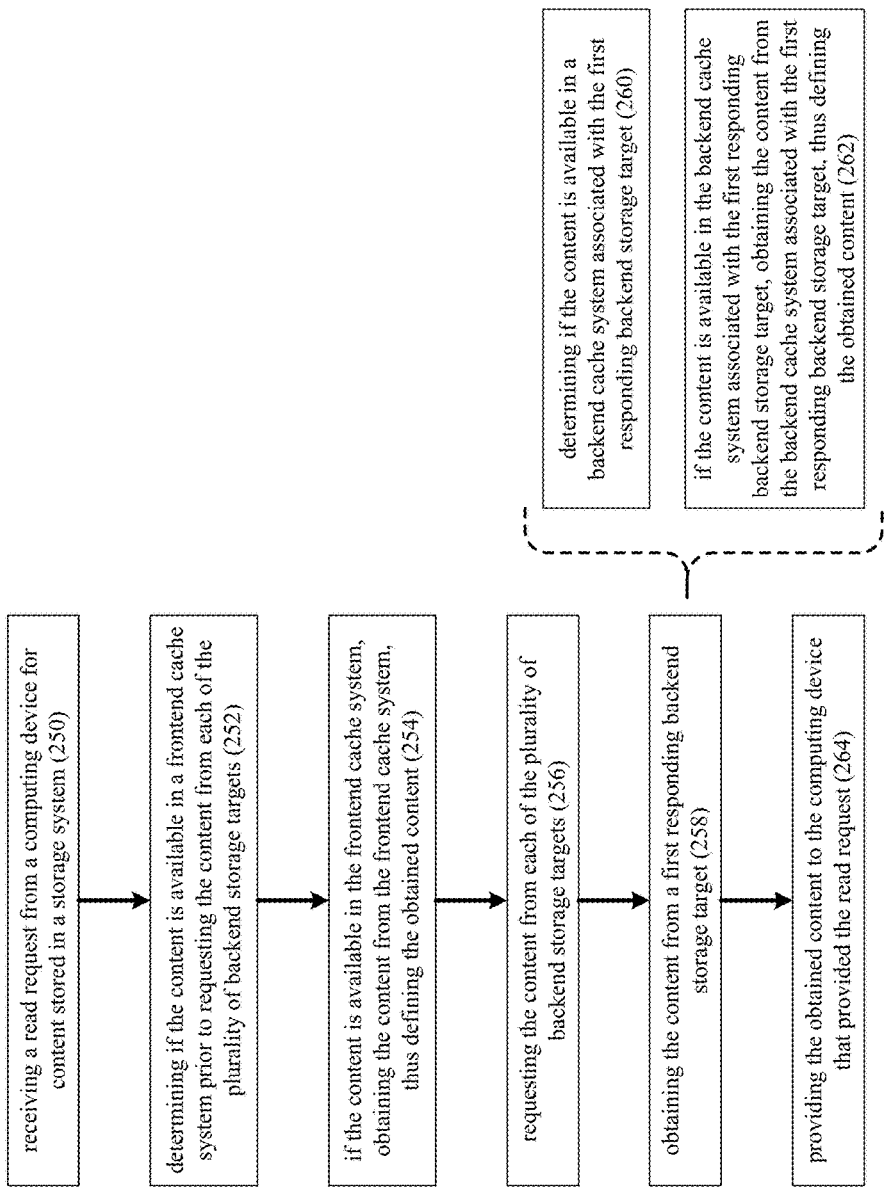
FIG. 4 is a flow chart of the storage management process of FIG. 1.

Referring also to FIG. 4 and continuing with the above-stated example, assume that storage management process 10 receives 250 a read request (e.g., read request 120 for content 118) from a computing device (e.g., personal computer 38). Since data array 200 within storage system 12 is configured in a mirrored (e.g., RAID 1) fashion, a copy of content 118 is stored on each of storage targets 202, 204, 206, 208 (as content $118_1$, $118_2$, $118_3$, $118_4$; respectively).

Storage management process 10 may initially determine 252 if the content (e.g., content 118) is available in a frontend cache system (e.g., frontend cache memory system 122) prior to requesting the content (e.g., content 118) from the plurality of backend storage targets (e.g., storage targets 202, 204, 206, 208).

If 252 the content (e.g., content 118) is available in the frontend cache system (e.g., frontend cache memory system 122), storage management process 10 may obtain 254 the content (e.g., content 118) from the frontend cache system (e.g., frontend cache memory system 122). Accordingly, in the event that the requested content (e.g., content 118) was available within frontend cache memory system 122, that content obtained from frontend cache memory system 122 may be provided to (in this example) personal computer 38 to satisfy read request 120.

If 252 the content (e.g., content 118) is not available in the frontend cache system (e.g., frontend cache memory system 122), storage management process 10 may request 256 the content (e.g., content 118) from each of the plurality of backend storage targets (e.g., storage targets 202, 204, 206, 208). Since data array 200 includes storage targets 202, 204, 206, 208 configured as a RAID 1 array, content 118 is mirrored between storage targets 202, 204, 206, 208 and, therefore, available from each of storage targets 202, 204, 206, 208. Specifically, by requesting 256 content 118 from each of storage targets 202, 204, 206, 208 (as opposed to only one of storage targets 202, 204, 206, 208), performance of storage system 12 may be enhanced, as the read request 120 will be satisfied as quickly as possible (i.e., by the first of storage targets 202, 204, 206, 208 to respond).

Accordingly, storage management process 10 may obtain 258 content 118 from the first responding backend storage target, chosen from plurality of backend storage targets 202, 204, 206, 208, thus defining obtained content (i.e., the content that was requested in read request 120 and obtained in response to that read request).

When obtaining 258 content 118, storage management process 10 may determine 260 if content 118 is available in a backend cache system associated with the first responding backend storage target. Specifically and as discussed above, each of storage targets 202, 204, 206, 208 may include a backend cache system (e.g., backend cache systems 210, 212, 214, 216; respectively). Accordingly, when storage management process 10 obtains 258 content 118 from the first responding backend storage target, storage management process 10 may determine 260 if content 118 is available in any of a backend cache systems 210, 212, 214, 216, as backend cache systems 210, 212, 214, 216 would be capable of providing content 118 more quickly than storage targets 202, 204, 206, 208 (respectively).

Accordingly, if 260 content 118 is available (in this example) from the backend cache system, storage management process 10 may obtain 262 content 118 from the backend cache system associated with the first responding backend storage target.

Once content 118 is obtained (e.g., from frontend cache system 122, one of backend cache systems 210, 212, 214, 216, or one of storage targets 202, 204, 206, 208), storage management process 10 may provide 264 the obtained content (e.g., content 118) to the computing device (e.g., personal computer 38) that provided read request 120.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving a write request at a storage processor to write content to a storage system, wherein the storage processor is coupled to the storage system using a network infrastructure;
   writing the content to a frontend cache system of the storage processor;
   writing the content to the storage system, wherein the storage system includes a plurality of backend storage targets configured to form a mirrored storage system wherein data written to any one of the backend storage targets is written to every backend storage target of the plurality of backend storage targets and wherein the content is written to a separate backend cache system associated with each backend storage target prior to writing the content to each backend storage target, wherein the mirrored storage system is a RAID 1 array;
   receiving a read request from a computing device for the content stored in the storage system;
   determining if the content is available in the frontend cache system;
   if the content is available in the frontend cache system, obtaining the content from the frontend cache system;
   if the content is not available in the frontend cache system:
      requesting the content from each of the plurality of backend storage targets,
      obtaining the content from a first responding backend storage target, chosen from the plurality of backend storage targets, thus defining obtained content, wherein obtaining the content from a first responding backend storage target includes:
         determining if the content is available in a backend cache system associated with the first responding backend storage target,
         if the content is available in the backend cache system associated with the first responding backend storage target, obtaining the content from the backend cache system associated with the first responding backend storage target, if the content is not available in the backend cache system associated with the first responding backend storage target, obtaining the content from the first responding backend storage target; and providing the obtained content to the computing device that provided the read request.

2. The computer-implemented method of claim 1 wherein the plurality of backend storage targets includes at least one hard disk drive.

3. The computer-implemented method of claim 1 wherein the plurality of backend storage targets includes at least one solid state disk.

4. A computer program product residing on a non-transitory computer readable medium having a plurality of instructions stored thereon which, when executed by a processor, cause the processor to perform operations comprising:

receiving a write request at a storage processor to write content to a storage system, wherein the storage processor is coupled to the storage system using a network infrastructure;

writing the content to a frontend cache system of the storage processor;

writing the content to the storage system, wherein the storage system includes a plurality of backend storage targets configured to form a mirrored storage system wherein data written to any one of the backend storage targets is written to every backend storage target of the plurality of backend storage targets and wherein the content is written to a separate backend cache system associated with each backend storage target prior to writing the content to each backend storage target, wherein the mirrored storage system is a RAID 1 array;

receiving a read request from a computing device for the content stored in the storage system;

determining if the content is available in the frontend cache system;

if the content is available in the frontend cache system, obtaining the content from the frontend cache system;

if the content is not available in the frontend cache system:

requesting the content from each of the plurality of backend storage targets, obtaining the content from a first responding backend storage target, chosen from the plurality of backend storage targets, thus defining obtained content, wherein obtaining the content from a first responding backend storage target includes:

determining if the content is available in a backend cache system associated with the first responding backend storage target, if the content is available in the backend cache system associated with the first responding backend storage target, obtaining the content from the backend cache system associated with the first responding backend storage target, if the content is not available in the backend cache system associated with the first responding backend storage target, obtaining the content from the first responding backend storage target; and providing the obtained content to the computing device that provided the read request.

5. The computer program product of claim 4 wherein the plurality of backend storage targets includes at least one hard disk drive.

6. The computer program product of claim 4 wherein the plurality of backend storage targets includes at least one solid state disk.

7. A computing system including a processor and memory configured to perform operations comprising:

receiving a write request at a storage processor to write content to a storage system, wherein the storage processor is coupled to the storage system using a network infrastructure;

writing the content to a frontend cache system of the storage processor;

writing the content to the storage system, wherein the storage system includes a plurality of backend storage targets configured to form a mirrored storage system wherein data written to any one of the backend storage targets is written to every backend storage target of the plurality of backend storage targets and wherein the content is written to a separate backend cache system associated with each backend storage target prior to writing the content to each backend storage target, wherein the mirrored storage system is a RAID 1 array;

receiving a read request from a computing device for the content stored in the storage system;

determining if the content is available in the frontend cache system;

if the content is available in the frontend cache system, obtaining the content from the frontend cache system;

if the content is not available in the frontend cache system:

requesting the content from each of the plurality of backend storage targets, obtaining the content from a first responding backend storage target, chosen from the plurality of backend storage targets, thus defining obtained content, wherein obtaining the content from a first responding backend storage target includes:

determining if the content is available in a backend cache system associated with the first responding backend storage target, if the content is available in the backend cache system associated with the first responding backend storage target, obtaining the content from the backend cache system associated with the first responding backend storage target, if the content is not available in the backend cache system associated with the first responding backend storage target, obtaining the content from the first responding backend storage target; and providing the obtained content to the computing device that provided the read request.

8. The computing system of claim 7 wherein the plurality of backend storage targets includes at least one hard disk drive.

9. The computing system of claim 7 wherein the plurality of backend storage targets includes at least one solid state disk.

* * * * *